(12) United States Patent
Fridman

(10) Patent No.: US 11,693,236 B2
(45) Date of Patent: Jul. 4, 2023

(54) HYPERSPECTRAL CAMERA

(71) Applicant: NORSK ELEKTRO OPTIKK AS, Skedsmokorset (NO)

(72) Inventor: Andrei L. Fridman, Eidsvoll Verk (NO)

(73) Assignee: NORSK ELEKTRO OPTIKK AS, Skedsmokorset (NO)

( * ) Notice: Subject to any disclaimer, the term of this patent is extended or adjusted under 35 U.S.C. 154(b) by 322 days.

(21) Appl. No.: 17/259,154

(22) PCT Filed: Jul. 9, 2019

(86) PCT No.: PCT/NO2019/050146
§ 371 (c)(1),
(2) Date: Jan. 8, 2021

(87) PCT Pub. No.: WO2020/013704
PCT Pub. Date: Jan. 16, 2020

(65) Prior Publication Data
US 2021/0157132 A1    May 27, 2021

(30) Foreign Application Priority Data
Jul. 10, 2018 (NO) .................................. 20180965

(51) Int. Cl.
*G02B 27/00* (2006.01)
*G02B 3/06* (2006.01)
(Continued)

(52) U.S. Cl.
CPC ........... *G02B 27/0025* (2013.01); *G02B 3/06* (2013.01); *G02B 13/0095* (2013.01); *G03B 17/08* (2013.01); *H04N 25/60* (2023.01)

(58) Field of Classification Search
None
See application file for complete search history.

(56) References Cited

U.S. PATENT DOCUMENTS 6,100,974 A   8/2000 Reininger
9,891,107 B1  2/2018 Mitchell
(Continued)

OTHER PUBLICATIONS

Luis Gomez-Chova et al., "Modelling spatial and spectral systematic noise patterns on CHRIS/PROBA hyperspectral data", Image and Signal Processing for Remote Sensing XII, Proc. of SPIE, vol. 6365, 2006.

(Continued)

*Primary Examiner* — James M Hannett
(74) *Attorney, Agent, or Firm* — Hershkovitz & Associates, PLLC; Abe Hershkovitz

(57) ABSTRACT

An optical system for a hyperspectral camera and a hyperspectral camera comprising such an optical system are disclosed. The optical system comprises fore optics (1000), an image sensor (1800), a slit (1500), relay optics (1200), a first optical element (2000) positioned before the slit (1500), where the first optical element (2000) is defocusing light in a direction parallel to the slit (1500) while keeping focus in a direction perpendicular to the slit (1500); and a second optical element (2100) positioned after the slit (1500), where the second optical element (2100) is compensating the defocus of the depicted scene introduced by the first element (2000).

20 Claims, 5 Drawing Sheets

(51) Int. Cl.
    *G02B 13/00*    (2006.01)
    *G03B 17/08*    (2021.01)
    *H04N 25/60*    (2023.01)

(56) References Cited

U.S. PATENT DOCUMENTS

| | | | | |
|---|---|---|---|---|
| 2003/0133109 | A1* | 7/2003 | Murguia | G01J 3/14 |
| | | | | 356/326 |
| 2004/0156048 | A1* | 8/2004 | Mitchell | G01J 3/2823 |
| | | | | 356/305 |
| 2006/0082772 | A1 | 4/2006 | Kehoe | |
| 2010/0328659 | A1* | 12/2010 | Bodkin | G01J 3/0205 |
| | | | | 356/326 |
| 2012/0218548 | A1 | 8/2012 | Bodkin | |
| 2014/0293062 | A1* | 10/2014 | Hoye | G01J 3/2803 |
| | | | | 348/162 |
| 2019/0323888 | A1* | 10/2019 | Streuber | H04N 23/58 |

OTHER PUBLICATIONS

International Search Report in International Application No. PCT/NO2019/050146, dated Nov. 21, 2019.
Written Opinion of the International Searching Authority in International Application No. PCT/NO2019/050146, dated Nov. 21, 2019.
International Preliminary Report on Patentability in International Application No. PCT/NO2019/050146, dated Jan. 12, 2021.
Norwegian Search Report in related Norwegian Patent Application No. 20180965, dated Feb. 8, 2019.

* cited by examiner

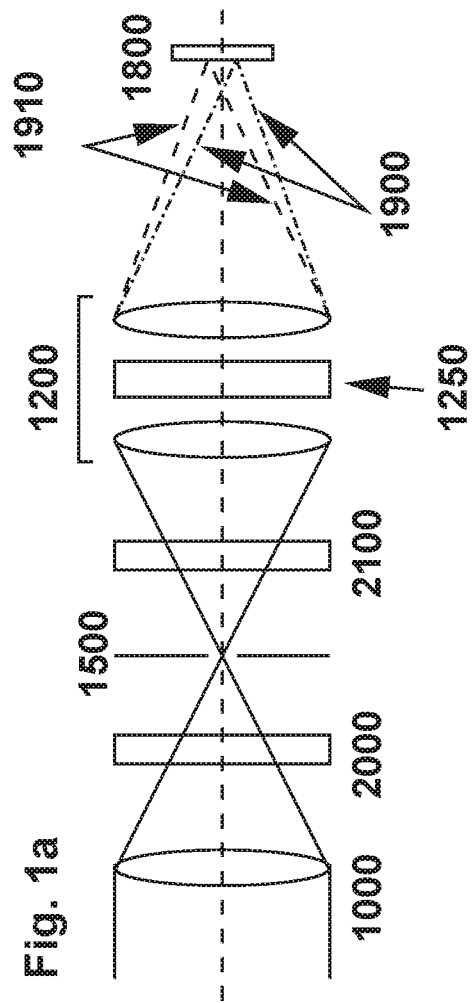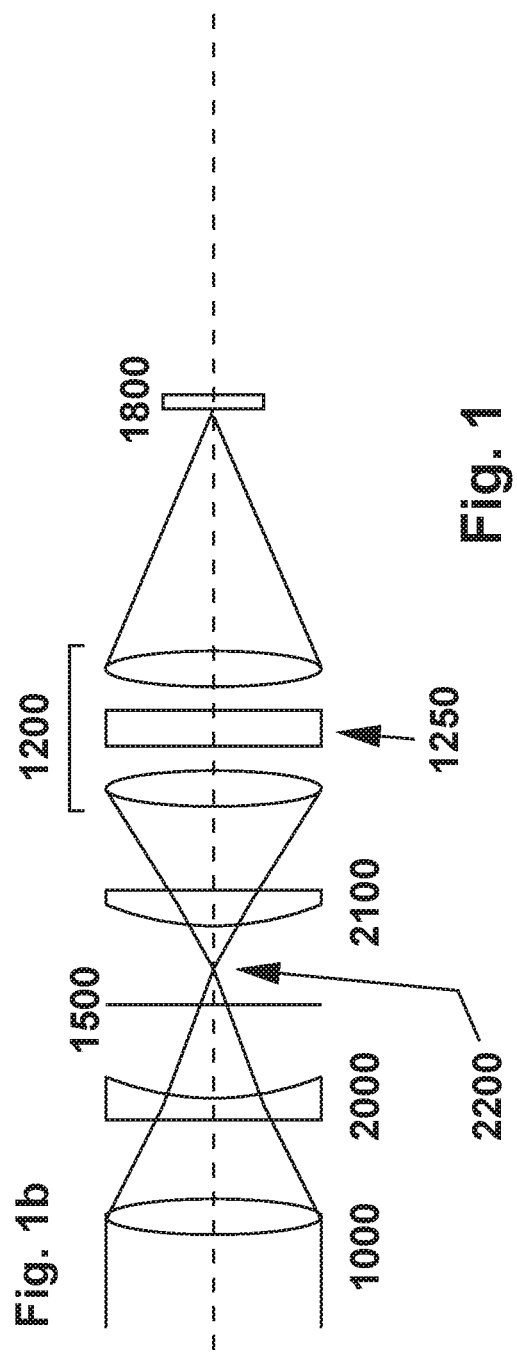

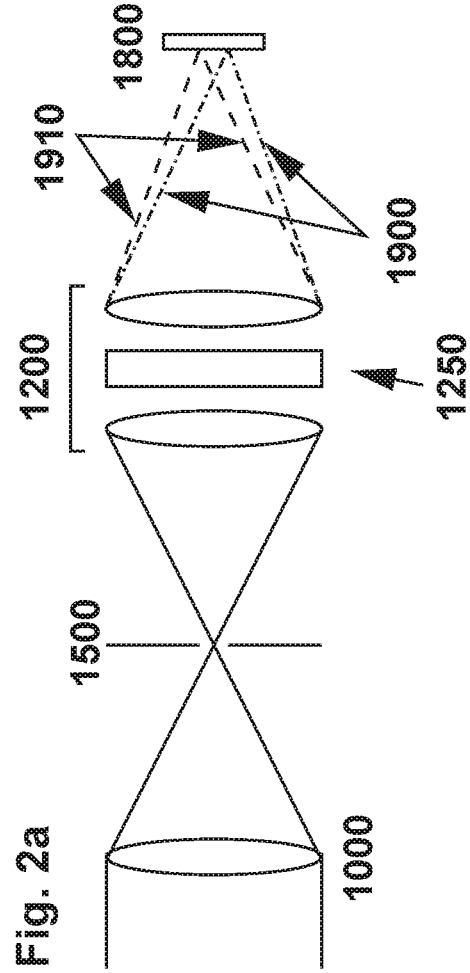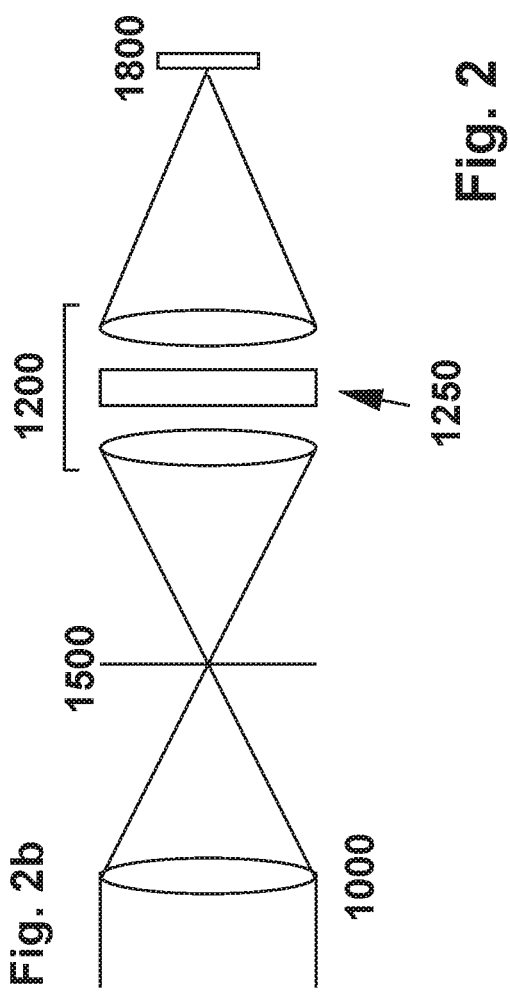

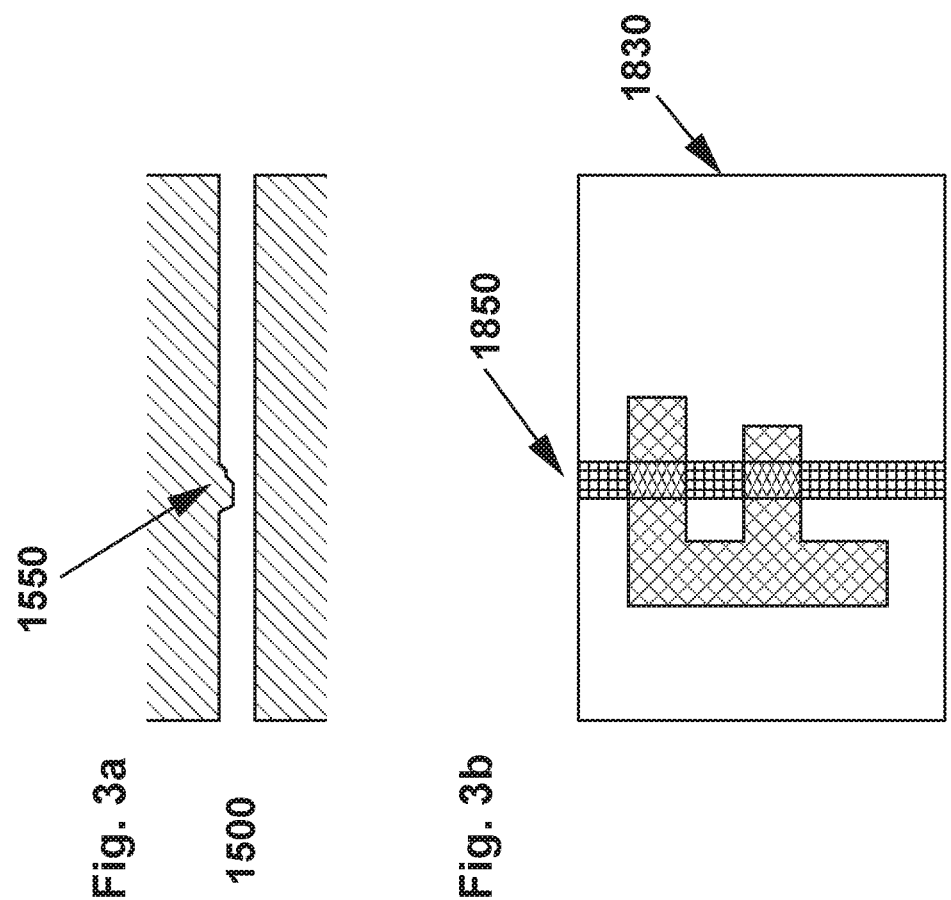

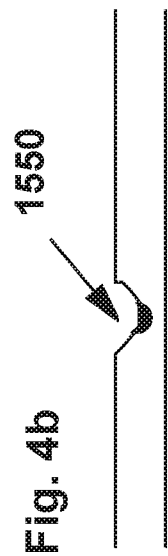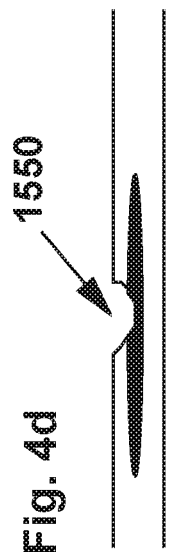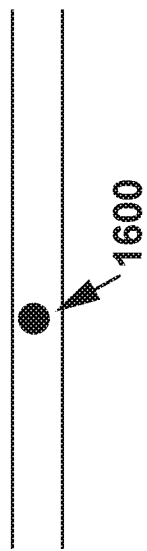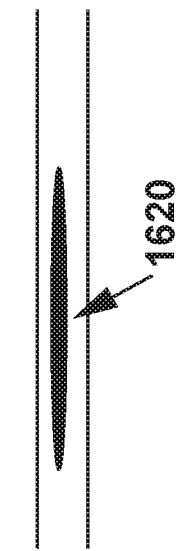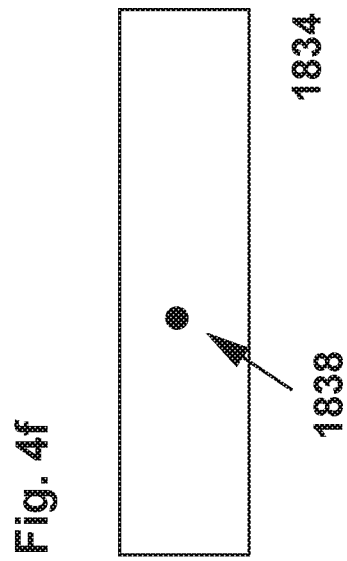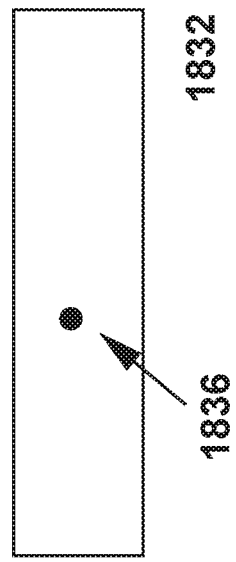
Fig. 4

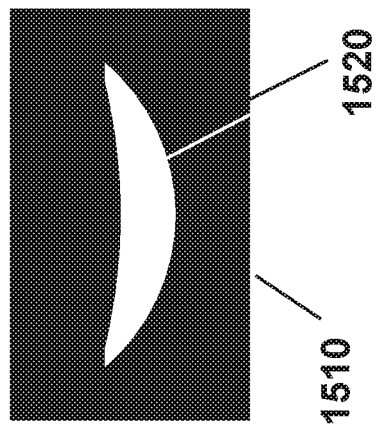
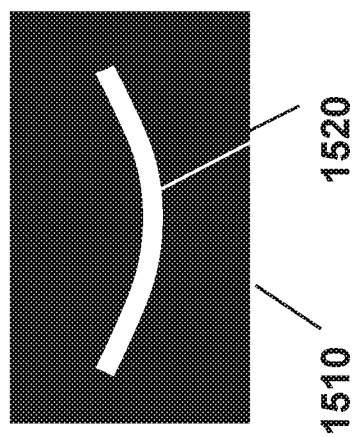
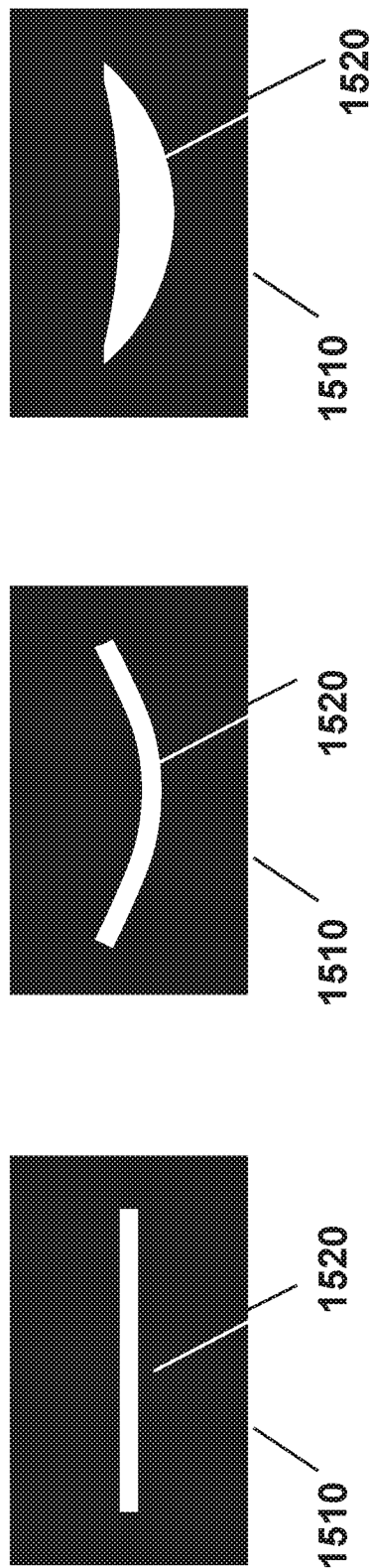
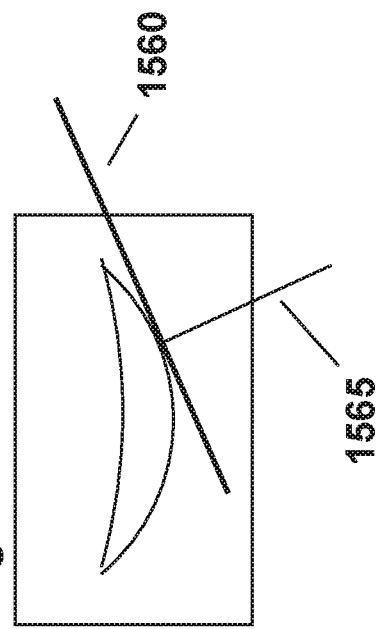
Fig. 5

HYPERSPECTRAL CAMERA

BACKGROUND OF THE INVENTION

Field of the Invention

The invention relates in general to hyperspectral cameras of the "push broom" type. More specifically, the invention relates to an optical system for a hyperspectral camera, and a hyperspectral camera comprising such an optical system. The invention also relates to improvement of the quality of hyperspectral data.

Background of the Invention

A hyperspectral camera of the push broom type i.e., a hyperspectral camera that scans the scene line by line, comprises a fore optics, a slit that defines the line in the scene that is being depicted, relay optics with dispersive element and an image sensor. A design of a hyperspectral camera will normally be subject to different trade-offs and optimisations to reduce errors and deviations in the data produced from the camera. Mechanical imperfections of the slit could lead to different thicknesses along the slit resulting in different amounts of light passing through the slit at different locations. This could lead to darker and lighter stripes in the resulting image.

A push broom hyperspectral camera typically comprises:
fore optics—optical subsystem that creates an image of a scene that is being depicted;
slit—a component that blocks all light from the scene with an exception of a narrow stripe, effectively cutting a narrow area out of the scene;
relay optics with a dispersive element—optical subsystem that projects an image of the very narrow area of the scene onto an image sensor with the light being spectrally dispersed in the direction perpendicular to the slit;
image sensor.

The instantaneous field of view of such a camera is a narrow stripe. A two dimensional image of the scene is achieved by moving the camera relative to the scene in the direction perpendicular to the slit and taking several exposures in the process.

FIG. 2 shows a simplified hyperspectral camera that contains all these elements and subsystems. In a real hyperspectral camera, each subsystem is usually more complex than a single element in order to achieve the required quality of the optical image. FIG. 2 shows transmissive and refractive elements, but all or any of the optical elements can be of a reflective type.

PRIOR ART

U.S. Pat. No. 6,100,974 to California Institute of Technology describes a hyperspectral camera based on an "Offner" design. FIG. 4 in the patent shows a typical layout of an Offner spectrometer. Fore optics (in this case, a three-mirror anastigmat) forms an intermediate image of a scene. A slit is positioned in the same plane as the intermediate image. The slit cuts out a narrow area from the image. This area is projected by relay optics onto a sensor. Since the relay optics has a dispersive element (a convex diffraction grating), the image of the narrow area of the scene is spectrally dispersed on the two-dimensional sensor array. Different pixel rows of the array are the image of the narrow area of the scene in different spectral bands. A full three-dimensional hyperspectral datacube (two spatial dimensions and one spectral dimension) is acquired by moving the camera relative to the scene in the direction perpendicular to the slit.

Academic publication "Modelling spatial and spectral systematic noise patterns on CHRIS/PROBA hyperspectral data", Luis Gomez-Chova et al., Image and Signal Processing for Remote Sensing XII, Proc. of SPIE Vol. 6365, 63650Z, (2006), describes challenges with calibration of data including stripes in the image data. FIG. 1 of the publication shows how a slit with a variable width would cause artefacts (stripes) in the acquired image. In the text it is explained that such variations of the slit width can be characterized, and this calibration data can be used for removing the stripes from the acquired data. It is pointed out that, during use or transportation, the optical system may be affected, and the calibration data will no longer be valid. The authors of the publication explain a few image processing methods that make various assumptions about the image and are likely to reduce intensity of the stripes.

Patent U.S. Pat. No. 9,891,107 B1 describes an optical system which can be used either as a pushroom hyperspectral camera or a temporal two-dimensional camera. The optical system has a slit that can be moved in and out of the optical path, as well as a variable dispersion dispersive element. When the slit is placed in the optical path of the optical system and the dispersive element is in the dispersive mode of operation, then the optical system functions as a pushroom hyperspectral camera. When the slit is moved out of the optical path and the dispersive element is in the non-dispersive mode of operation, then the optical system functions as a temporal two-dimensional camera. Also, because both the slit position and the dispersion strength are continuously adjustable, the optical system in the hyperspectral camera mode has additional benefits compared to more traditional pushroom hyperspectral cameras. The slit movement can be used for scanning across the scene, eliminating the need for external scanning mechanisms. The dispersion strength can be increased for improving spectral resolution or decreased for improving the signal-to-noise ratio.

SUMMARY OF THE INVENTION

Problems to be Solved by the Invention

The main objective with the current invention is to improve image quality from push broom hyperspectral cameras by reducing striping artefacts that may appear because of mechanical imperfections of the slit.

Although ideally, the slit has a rectangular shape with straight edges, real slits normally have slightly varying width due to mechanical imperfections on the edges. Since it is desired to have sharp image of both the slit and the scene in the sensor plane, these small imperfections create variations in illumination of the sensor. These variations do not represent features of the scene but are artefacts due to uneven transmission along the slit. Possible examples of this could be mechanical imperfections of the slit edges or even dust particles stuck in the slit. Image acquisition with a push broom hyperspectral camera requires scanning, and in the acquired image more narrow areas of the slit create faint dark stripes while the wider areas of the slit create faint light stripes.

This effect can be mitigated by careful characterisation of the camera: the unwanted variations of illumination are mapped, and appropriate correction is applied to acquired images. The problem is that with time the slit may slightly move relative to the sensor plane (as well as the dust particles may appear). While this small movement is not important for slit imperfections of large size that slowly change along the slit (such as the slit edges being slightly non-parallel to each other), the calibration that took into account small serrations, burrs and specs of dust will no longer be correct. As the result, the image will have faint straight thin stripes running parallel to the scanning direction.

Re-calibration of the camera would solve the problem until a new small movement of the slit takes place, a new spec of dust sets on the slit, etc.

Means for Solving the Problems

The objectives are achieved according to the invention by an optical system for a hyperspectral camera as defined in the preamble of independent claim 1, having the features of the characterising portion of claim 1.

A number of non-exhaustive embodiments, variants or alternatives of the invention are defined by the dependent claims.

SUMMARY OF THE INVENTION

The basic concept of the invention is to place a first optical element (2000) in front of the slit and second optical element (2100) after the slit. The objective of the first optical element is to expand the beam in one direction only i.e., along the slit so that light normally related to a point in the scene and in the image line will be spread along a longer distance along the slit so that variations in the opening of the slit will have less influence on the image signal at each point in the image line that is being depicted.

The objective of the second optical element is to correct for the effects introduced by the first optical element so that the resulting image data will look as in the normal case with the exception that dark or light stripes in the image have been blurred and thereby reduced.

From an optical designers point of view the features of the scene are first defocused by the first optical element and then focused by the second optical element while imperfections of the slit are only defocused by the second optical element.

One possible embodiment of the invention is to place a weak negative cylindrical lens in front of the slit as the first optical element and a matched weak positive cylindrical lens after the slit as the second optical element. The idea is that the second optical element should cancel or correct for the effects introduced by the first optical element.

A first aspect of the invention is an optical system for a hyperspectral camera, where the optical system comprises a fore optics being an optical subsystem arranged for creating an image of a scene that is being depicted, an image sensor, and a slit comprising a slit surface and a slit opening through the slit, the slit opening forming a stripe on the slit surface, where the stripe has a length along a centre of the stripe and a width across the stripe perpendicular to each point of the centre of the stripe, where the total length is at least an order of magnitude greater than the maximum width, where the slit is arranged for blocking light from the scene with exception of light passing through the slit opening, effectively cutting a narrow area out of the scene. The optical system further comprises relay optics comprising a dispersive element, the relay optics being an optical subsystem arranged for projecting an image of the narrow area of the scene onto the image sensor with light from the narrow scene being spectrally dispersed in a direction perpendicular to the tangent of the stripe. The optical system further comprises a first optical element positioned before the slit, where the first optical element has a form that defocuses light in a direction parallel to the tangent of the stripe while keeping focus in a direction perpendicular to the tangent of the stripe at each point of the centre, and a second optical element positioned after the slit, where the second optical element is compensating the defocus introduced by the first element.

Optionally, the slit surface is plane, and, optionally, the narrow stripe is either linear or cylindrical.

Optionally, the first optical element comprises a negative cylindrical lens, and the second optical element comprises a positive cylindrical lens.

Optionally, the first optical element comprises a positive cylindrical lens, and the second optical element comprises a negative cylindrical lens.

Optionally, the first optical element is a fore optics with astigmatism so that the image on the slit surface is defocused in the direction parallel to the tangent of the slit, and the second optical element is relay optics with astigmatism arranged to cancel the astigmatism of the fore optics.

Optionally, the astigmatism in the fore optics and the relay optics is created by use of optical surfaces where optical power is different in two orthogonal X and Y directions, and where both directions are orthogonal to optical axis Z.

Optionally, the fore optics and the relay optics have at least one optical surface positioned off optical axis in both the fore optics and the relay optics to create astigmatism which will introduce defocus before the slit and compensate for the defocus after the slit, and further optionally, the astigmatism in the fore optics and relay optics is a partially uncorrected aberration astigmatism utilising that this aberration is non-zero off the optical axis, and positioning the entire slit off the optical axis.

Optionally, the first optical element is used to defocus light, and the second optical element is used to compensate for the defocus.

Optionally, the optical system comprises a module protecting the slit from dust particles and moisture using the first optical element and the second optical element as windows in the module protecting the slit.

Optionally, the module protecting the slit is one of the following: i) sealed and filled with nitrogen or an inert gas ii) evacuated to obtain vacuum inside.

A further aspect of the invention is a hyperspectral camera, where the camera comprises an optical system according to the invention, and where the camera further comprises control electronics arranged for i) controlling the image sensor and other camera functions, ii) acquiring an image or image line containing spatial and spectral image information, and iii) at least one of a) storing and b) transmitting said spatial and spectral image information.

A further aspect of the invention is a method for acquiring hyperspectral data using a hyperspectral camera comprising an optical system according to the invention.

A still further aspect of the invention is a method for improving image quality of a hyperspectral camera, comprising the following steps:
  defocusing light from a scene in a direction parallel to a tangent of an opening in a slit before the light from the scene reaches the slit;
  cutting a narrow area out of the scene by blocking light from the scene by a surface of a slit, and only allowing light from the narrow area to pass through an opening in the slit;

compensating for the defocusing after the light from the narrow area has passed the slit;

spectrally dispersing the light from the narrow area after the compensating and projecting a spectrally dispersed image of the narrow area onto an image sensor.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

The invention will be further described below in connection with exemplary embodiments which are schematically shown in the drawings, wherein:

FIGS. 1a and 1b shows the principle of the optical system of a hyperspectral camera according to the current invention.

FIG. 1a shows a side view of the optical layout of a camera with the slit (1500) that is perpendicular to the drawing plane.

FIG. 1b is similar to FIG. 1a except that the optical system has been rotated 90 degrees around the optical axis.

FIG. 2 shows a standard implementation of an optical system of a hyperspectral camera. FIG. 2 is similar to FIG. 1. However, the system shown in FIG. 2 does not comprise astigmatic elements (2000, 2100).

FIG. 2a shows the optical system as seen with the slit (1500) perpendicular to the drawing plane.

FIG. 2b shows the optical system of FIG. 2a but rotated 90 degrees.

FIG. 3 shows a slit (1500) with a minor mechanical defect (1550) and the effect on an acquired image.

FIG. 3a shows the slit (1500) with a mechanical defect (1550) making the slit more narrow at one location.

FIG. 3b illustrates how a mechanical defect (1550) in the slit (1500) can influence a resulting image (1830).

FIG. 4 shows cross sections of light rays (1600, 1620) when passing the slit plane (1500) in different cases.

FIG. 4a shows the cross section of rays (1600) from one point in the scene as the rays passes the slit plane (1500) when no defects in the slit plane (1500) are present for a hyperspectral camera according to prior art.

FIG. 4b shows the same cross section of rays when a mechanical defect (1550) is present in the region.

FIG. 4c shows a cross section of rays (1620) from a point in the scene for a hyperspectral camera according to the current invention.

FIG. 4d shows a slit with a mechanical defect (1550) in a hyperspectral camera according to the current invention.

FIG. 4e shows a resulting image (1832) displaying a point (1836) in the image for the normal case for a hyperspectral camera according to the current invention.

FIG. 4f shows a point (1838) in a resulting image (1834) in the case with a mechanical defect (1550) in the slit (1500) for a hyperspectral camera according to the current invention.

FIG. 5a shows a slit surface (1510) with a rectangular slit opening (1520).

FIG. 5b shows a slit surface (1510) with a curved slit opening (1520).

FIG. 5c shows a slit surface (1510) with a slit opening (1520) which has different width along the slit opening (1520).

FIG. 5d shows a possible tangent (1560) to a long side of the slit opening (1520) with the perpendicular direction (1565) relatively to the tangent (1560) indicated.

| Description of reference signs | |
|---|---|
| Number | Description |
| 1000 | Fore optics |
| 1200 | Relay optics |
| 1250 | Dispersive element |
| 1500 | Slit plane |
| 1510 | Slit surface, either plane or a 3D surface |
| 1520 | Slit opening, could have different shapes, aspect ratio length:width 10:1 or greater |
| 1560 | Tangent to a long side of the slit opening |
| 1565 | Direction perpendicular to the tangent |
| 1550 | Mechanical defect |
| 1600 | Cross section of rays |
| 1620 | Cross section of (light) rays |
| 1800 | Image sensor |
| 1830 | Resulting image |
| 1832 | Resulting image |
| 1834 | Resulting image |
| 1836 | Image of a point, according to the invention |
| 1838 | Image of a point, according to the invention, defect present in the slit |
| 1850 | Longitudinal stripe |
| 1900 | Light from a first wavelength |
| 1910 | Light from a second wavelength |
| 2000 | First astigmatic element |
| 2100 | Second astigmatic element |
| 2200 | Plane/point behind the slit plane |

DETAILED DESCRIPTION OF EMBODIMENTS WITH REFERENCES TO THE DRAWINGS

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Before describing embodiments with reference to the drawings, the invention is introduced in a more general manner.

The image of the scene is defocused in the slit plane in the direction X approximately parallel to the slit, while maintaining good focus in the direction Y perpendicular to the slit. After the slit image is focused in the direction X, while still maintaining good focus in the direction Y.

Here «before the slit» indicates any position before the slit including the position before the fore optics. Similarly, «after the slit» means «anywhere after the slit», including after the relay optics.

The same functionality can be implemented by embedding these defocusing elements into the fore optics and the relay optics. For example, some optical surfaces may be made astigmatic, i.e. having slightly different optical power in two orthogonal directions. Alternatively, an optical system may have residual astigmatism and at least one element of the optical system may be used off-axis. An example of such an embodiment is a three-mirror or four-mirror anastigmat. Less ideal, but a possible solution is to use a fully axially symmetric system with uncorrected astigmatism. Such an optical system will reduce striping artefacts everywhere in the image except for the middle of the field of view. As in the case of two weak cylindrical lenses, any of these solutions should have the relay optics with astigmatism that compensates the astigmatism of the fore optics.

FIG. 1 shows the principle of the optical system of a hyperspectral camera according to the current invention. FIG. 1a shows the optical system from one side so that the slit (1500) is perpendicular to the drawing plane. The fore optics (1000) collects light and focuses the light so that the focus plane is in the slit plane (1500). After that the light propagates through the relay optics (1200) comprising a dispersive element (1250) and is focused onto an image sensor (1800). Due to the dispersive element (1250) light with different wavelengths is focused onto different parts of the image sensor (1800). The rays of example wavelength lambda1, are indicated by arrows (1900) while the rays of example wavelength lambda2 are indicated by arrows (1910). The light also passes through a first astigmatic element (2000) before the slit (1500) and the light also passes through a second astigmatic element (2100) after the slit. As can be seen from the figures the two astigmatic elements (2000, 2100) are neutral in the view/section shown in FIG. 1a.

The view in FIG. 1b is similar to FIG. 1a except that the optical system has been rotated 90 degrees around the optical axis so that the slit is now parallel to the drawing plane. Light is collected by the fore optics (1000) to be focused in the slit plane, and the first astigmatic element (2000) defocuses light in the direction parallel to the slit (FIG. 1b) while keeping the focus perpendicular to the slit (FIG. 1a). The light is then collected by the second astigmatic element (2100) and propagates through the relay optics (1200) comprising a dispersive element (1250). The light is then focused onto the image sensor (1800). The second astigmatic element (2100) will neutralise the effect of the first astigmatic element (2000).

In FIG. 1 the light passes the slit plane (1500) without being focused into a point instead the light is distributed across a much larger cross section (1620). Due to the wide cross section (1620) small defects in the slit (1500) will have much less influence on the signal intensity at the image sensor (1800).

FIG. 2 shows a standard implementation of an optical system of a hyperspectral camera. FIG. 2 is similar to FIG. 1. However, the system shown in FIG. 2 does not comprise astigmatic elements (2000, 2100). FIG. 2a shows the optical system with the slit (1500) being perpendicular to the drawing plane while the optical system is rotated 90 degrees in FIG. 2b. In both views, FIG. 2a and FIG. 2b, the light is focused in the slit plane (1500). Deviations in the thickness of the slit opening could then have impact on the actual amount of light passing through the slit possibly leading to longitudinal stripes in the resulting image. The fore optics (1000) collects light and focuses it into the slit plane (1500). The relay optics comprising a dispersive element (1250) is collecting the light passing the slit and focuses it onto the image sensor (1800). Light from a first wavelength is focused onto one location on the image sensor (1800) indicated by arrows (1900) while light from a second wavelength is focused onto another position indicated by arrows (1910).

FIG. 3 shows a slit (1500) with a minor mechanical defect (1550) and the effect on an acquired image. FIG. 3a shows the slit (1500) with a mechanical defect (1550) making the slit more narrow at one location. A narrow slit will typically let less light through and a slit with a mechanical defect (1550) making a small section more narrow than specified will let less light through in the region with the mechanical defect (1550) resulting in a darker stripe (1850) in a resulting image (1830).

FIG. 3b illustrates how a mechanical defect (1550) in the slit (1500) can influence a resulting image (1830). A longitudinal stripe (1850) will be present in the image (1830).

FIG. 4 shows cross sections of light rays (1600, 1620) when passing the slit plane (1500) in different cases as well as some examples of a resulting image (1832, 1834). FIG. 4a shows the cross section of rays (1600) from one point in the scene as the rays passes the slit plane (1500) when no defects in the slit plane (1500) are present for a hyperspectral camera according to prior art. FIG. 4b shows the same cross section of rays when a mechanical defect (1550) is present in the region. As can be easily understood the amount of light passing through a region comprising a mechanical defect (1550) can be significantly reduced.

FIG. 4c shows a cross section of rays (1620) from a point in the scene for a hyperspectral camera according to the current invention. Rays are passing the slit (1500) in a wide cross section (1620) instead of in a point shaped cross section (1600).

FIG. 4d shows a slit with a mechanical defect (1550) in a hyperspectral camera according to the current invention. The rays have the same wide cross section as in FIG. 4c. In the case shown in FIG. 4d the mechanical defect (1550) will only influence on part of the cross section so that the reduction in the light intensity will be much less than the example shown in FIG. 4b.

FIG. 4e shows a resulting image (1832) displaying a point (1836) in the image for the normal case for a hyperspectral camera according to the current invention. FIG. 4f shows a point (1838) in a resulting image (1834) in the case with a mechanical defect (1550) in the slit (1500) for a hyperspectral camera according to the current invention. In a hyperspectral camera according to the current invention, the image is almost not affected by mechanical defects (1550) in the slit (1500).

FIG. 5 shows different aspects of the slit surface and the slit opening. One alternative to the shown embodiment is to use a reflective slit instead of a slit design using an opening in a slit surface. Then the opening is replaced by a reflective surface like a mirror, but otherwise the design could use the current invention in a similar fashion.

FIG. 5a shows a slit surface 1510 with a rectangular slit opening (1520). The slit opening (1520) also could be curved as shown in FIG. 5b. FIG. 5c shows a slit surface (1510) with a slit opening (1520) forming a stripe in the slit surface (1510), which has different width along the slit opening (1520). By a tangent to the stripe is meant a line tangential to one of the two long sides of the stripe or the centre line of the stripe, or a line in between the three, at each point of the long sides or centre line respectively. FIG. 5d shows a possible tangent (1560) to a long side of the slit opening (1520) with the perpendicular direction (1565) relatively to the tangent (1560) indicated.

The slit could be either a straight or a curved slit. In the case with a straight slit, the slit will be positioned on a plane surface called a slit plane. In the case with the curved slit, the slit will be positioned on a curved geometrical surface. For simplicity, throughout this application the term "slit plane" will be used for both cases even though the slit could be straight or curved.

The invention claimed is:

1. An optical system for a hyperspectral camera, where the optical system comprises:
    fore optics (1000) being an optical subsystem arranged for creating an image of a scene that is being depicted;
    an image sensor (1800);
    a slit (1500) comprising a slit surface and a slit opening through the slit (1500), the slit opening forming a stripe on the slit surface, where the stripe has a length along a centre of the stripe and a width across the stripe perpendicular to each point of the centre of the stripe, where the total length is at least an order of magnitude greater than the maximum width, where the slit (1500) is arranged for blocking light from the scene with the exception of light passing through the slit opening, effectively cutting a narrow area out of the scene;
    relay optics (1200) comprising a dispersive element (1250), the relay optics (1200) being an optical subsystem arranged for projecting an image of the narrow area of the scene onto the image sensor (1800) with light from the narrow scene being spectrally dispersed in a direction perpendicular to the tangent of the stripe;
    wherein the optical system further comprises:
    a first optical element (2000) positioned before the slit (1500), the first optical element (2000) having a form that defocuses light in a direction parallel to the tangent of the stripe while keeping focus in a direction perpendicular to the tangent of the stripe; and
    a second optical element (2100) positioned after the slit (1500), the second optical element (2100) compensating the defocus introduced by the first element (2000).

2. An optical system according to claim 1, where the slit surface is either plane or cylindrical.

3. An optical system according to claim 1, where the narrow stripe is linear.

4. Optical system according to claim 1, where the first optical element (2000) comprises a negative cylindrical lens, and the second optical element (2100) comprises a positive cylindrical lens.

5. Optical system according to claim 1, where the first optical element (2000) comprises a positive cylindrical lens, and the second optical element (2100) comprises a negative cylindrical lens.

6. Optical system according to claim 1, where the first optical element (2000) is a fore optics with astigmatism so that the image on the slit surface is defocused in the direction parallel to the tangent of the slit (1500), and the second optical element (2100) is relay optics with astigmatism arranged to cancel the astigmatism of the fore optics.

7. Optical system according to claim 6, where the astigmatism in the fore optics and the relay optics is created by use of optical surfaces where optical power is different in two orthogonal X and Y directions, and where both directions are orthogonal to optical axis Z.

8. Optical system according to claim 6, where the fore optics and the relay optics have at least one optical surface positioned off optical axis in both the fore optics and the relay optics to create astigmatism which will introduce defocus before the slit (1500) and compensate for the defocus after the slit (1500).

9. Optical system according to claim 6, where the astigmatism in the fore optics and the relay optics is a partially uncorrected aberration astigmatism utilising that this aberration is non-zero off the optical axis, and positioning the entire slit (1500) off the optical axis.

10. Optical system according to claim 1, where the first optical element is used to defocus light, and the second optical element is used to compensate for the defocus.

11. Optical system according to claim 1, the optical system comprising a module protecting the slit (1500) from dust particles and moisture using the first optical element (2000) and the second optical element (2100) as windows in the module protecting the slit (1500).

12. Optical system according to claim 11, where the module protecting the slit (1500) is one of the following: i) sealed and filled with nitrogen or an inert gas ii) evacuated to obtain vacuum inside.

13. A hyperspectral camera, where the camera comprises an optical system according to claim 1, and where the camera further comprises control electronics arranged for i) controlling the image sensor and other camera functions, ii) acquiring an image or image line containing spatial and spectral image information, and iii) at least one of a) storing and b) transmitting said spatial and spectral image information.

14. Method for acquiring hyperspectral data using a hyperspectral camera comprising an optical system according to claim 1.

15. Method for improving image quality of a hyperspectral camera, comprising the following steps:
    defocusing light from a scene in a direction parallel to a tangent of an opening in a slit (1500) before the light from the scene reaches the slit (1500);
    cutting a narrow area out of the scene by blocking light from the scene by a surface of the slit (1500), and only allowing light from the narrow area to pass through an opening in the slit (1500);
    compensating for the defocusing after the light from the narrow area has passed the slit; and
    spectrally dispersing the light from the narrow area after the compensating, and projecting a spectrally dispersed image of the narrow area onto an image sensor (1800).

16. An optical system according to claim 2, wherein the narrow stripe is linear.

17. Optical system according to claim 2, wherein the first optical element comprises a negative cylindrical lens, and the second optical element comprises a positive cylindrical lens.

18. Optical system according to claim 3, wherein the first optical element comprises a negative cylindrical lens, and the second optical element comprises a positive cylindrical lens.

19. Optical system according to claim 16, wherein the first optical element comprises a negative cylindrical lens, and the second optical element comprises a positive cylindrical lens.

20. Optical system according to claim 2, wherein the first optical element comprises a positive cylindrical lens, and the second optical element comprises a negative cylindrical lens.

* * * * *